United States Patent [19]

Haataja

[11] 4,248,820
[45] Feb. 3, 1981

[54] METHOD FOR MOLDING APERTURES IN MOLDED WOOD PRODUCTS

[75] Inventor: Bruce A. Haataja, Lake Linden, Mich.

[73] Assignee: Board of Control of Michigan Technological University, Houghton, Mich.

[21] Appl. No.: 972,032

[22] Filed: Dec. 21, 1978

[51] Int. Cl.³ .............................................. B29J 5/06
[52] U.S. Cl. ..................................... 264/113; 264/118
[58] Field of Search ................................ 264/113, 118

[56] References Cited

U.S. PATENT DOCUMENTS

| | | | |
|---|---|---|---|
| 3,158,902 | 12/1964 | McPherson | 425/96 |
| 3,661,688 | 5/1972 | Wheeler | 264/119 |
| 3,846,219 | 11/1974 | Kunz | 264/113 |
| 3,873,662 | 3/1975 | Cartlidge | 264/113 |

Primary Examiner—Donald E. Czala
Assistant Examiner—James R. Hall

[57] ABSTRACT

A method is provided for forming a wood product comprised of wood flakes and binder intermixed therein, and including a hole or aperture molded into the product, the aperture including a densified, high strength periphery. The method includes the steps of providing a female die plate having a forming surface and a bore extending through the die plate, the bore converging in the direction away from the forming surface. A male die plate is also provided in opposed relation to the female die plate, the male die plate having a forming surface and a tapered forming member aligned with the bore in the female die plate. A mat comprised of wood flakes and intermixed binder is placed between the die plates, and the die plates are forced together to compress the mat between the forming surfaces, thereby forming a rigid composite body. The die plates also form a tapered aperture in the composite body, the tapered forming member and the complementary converging bore in the female die plate causing localized increased density of the periphery of the formed aperture.

1 Claim, 3 Drawing Figures

METHOD FOR MOLDING APERTURES IN MOLDED WOOD PRODUCTS

BACKGROUND OF THE INVENTION

This invention relates to a method for making articles such as pallets and other structures molded from wood particles and more particularly to a method for molding such structures from thin wood flakes intermixed with a binder, and wherein said structures include apertures molded therein, the apertures having densified, high strength peripheral edges.

Molding apparatus is commonly used to compress wood particles intermixed with a binder material to thereby form dense pressed wood products such as pressboard or particleboard. Such apparatus is illustrated, for purposes of example, in the McPherson U.S. Pat. No. 3,158,902, issued Dec. 1, 1964. Attention is also directed to the Winsnes U.S. Pat. No. 3,384,922, issued May 28, 1968 and the Rapisarda U.S. Pat. No. 3,517,410, issued June 30, 1970.

SUMMARY OF THE INVENTION

The invention provides a method for making molded wood products which include holes or apertures formed therethrough, the apertures being formed simultaneously with the molding of the article, and the apertures having high strength densified peripheries capable of resisting deformation or damage.

More specifically, the invention includes a method for forming a molded wood product comprised of wood flakes and binder intermixed therewith, the molded wood product including a hole therethrough, the hole having a densified periphery. The method includes the steps of providing a female die plate which includes a forming surface and a bore through the die plate, the bore being shaped to converge in the direction away from the forming surface. The method further comprises the step of providing a male die positioned in opposed relationship to the female die, the male die including a forming surface and a forming member extending from the forming surface and aligned with the bore, the forming member having a free end and tapering toward the free end. The method further includes the steps of placing a mat comprised of wood flakes and intermixed binder between the male die and the female die and forcing the female and the male dies together thereby compressing the mat to form a rigid composite body and forming a hole in the rigid composite body, the hole having a tapering configuration and a periphery comprised of material denser than the material of the rigid composite body.

In one embodiment of the invention, the mat placed between the male and female dies is formed by providing thin, elongated flake-like wood particles, mixing a resinous particle board binder with the particles, and depositing the wood particles to form a loosely felted layered mat, the wood particles in each layer of the mat lying substantially flat and in a plane general parallel to the major plane of the mat and the wood particles in each layer being randomly oriented with respect to each other.

For carrying out the invention there is included die apparatus for use in forming a molded wood product comprised of wood flakes and a binder, the die apparatus including a female die plate having a forming surface and a bore through the die plate, the bore intersecting the forming surface and having a tapered configuration converging away from the forming surface. The die apparatus also includes a male die supported in opposed relationship to the female die plate, the male die including a forming surface and a forming member extending from the forming surface, and aligned with the bore, the forming member tapering toward its free end. The die apparatus further includes means for forcing the male and female die plates together when a mat is positioned therebetween and for compressing the mat, the forming member being adapted to force a portion of the mat through the bore in the female die plate whereby a hole is formed in the molded product, the hole having a densified periphery.

In such apparatus, the female die plate can include a recess in its lower surface, the recess communicating with the bore in the female die and functioning as a cavity for receiving a plug of mat material forced through the die plate bore by the forming member.

The molded article so formed can include a rigid body having a major plane, the body being molded as a one piece unit from a layered mixture of resinous binder and flake-like wood particles disposed in stacked interleaved relation. Each layer of the wood flakes lies in substantially flat relationship and in a plane generally parallel to the major plane of the composite body with the wood flakes therein being randomly oriented. The body includes a first surface and a hole extending from the surface through the body, the hole converging in the direction away from the surface and the hole including a densified peripheral edge.

One of the advantages of the invention is that molded wood products can be formed having apertures formed simultaneously with compression of the wood flake mat during forming of the molded wood product. Accordingly, subsequent manufacturing steps can be avoided. Furthermore, in accordance with the present invention, the apertures formed in the reconstituted wood products have a reinforced or densified periphery thereby preventing wear in the vicinity of the aperture.

Other features and advantages of the invention will become known by reference to the following description, to the appended claims, and to the drawings.

Figure 1:
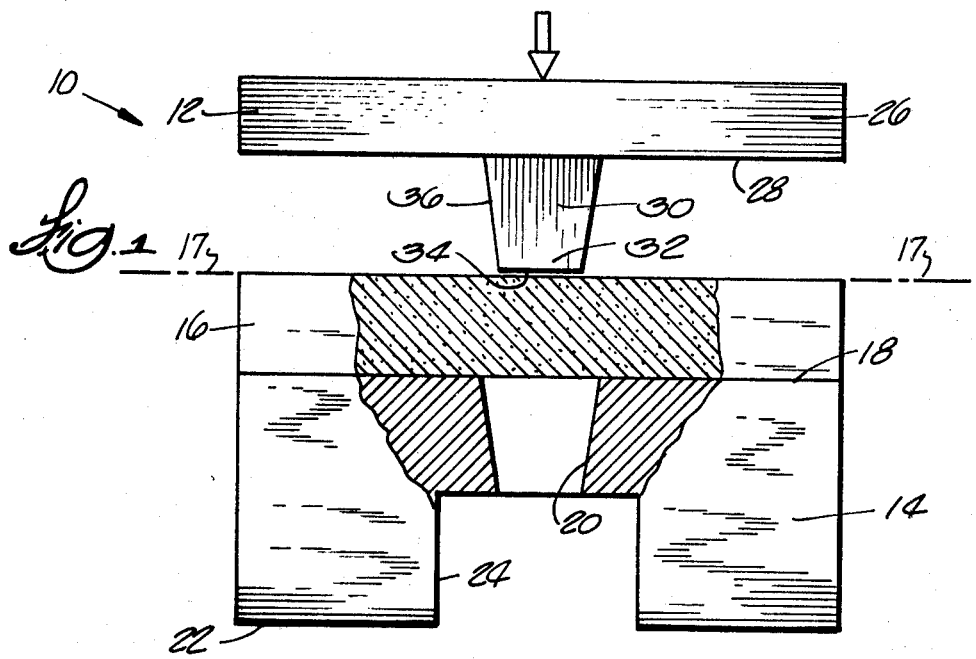
FIG. 1 is an elevation view illustrating the apparatus for use in practicing the method of the invention and showing a mat of composite material positioned between the mold halves.

Before describing at least one embodiment of the invention in detail, it is to be understood that the invention is not limited in its application to the details of construction and the arrangement of the components set forth in the following description or illustrated in the drawings. The invention is capable of other embodiments and of being practiced and carried out in various ways. Also, it is to be understood that the phraseology and terminology employed herein is for the purpose of description and should not be regarded as limiting.

DESCRIPTION OF A PREFERRED EMBODIMENT

The invention relates broadly to articles formed by die forming wood structures wherein wood flakes intermixed with a binder material are compressed in a mold apparatus, and more particularly to a method for forming wood structures having apertures or holes formed during the molding process, the holes including high strength densified peripheries.

Illustrated in FIG. 1 is a die apparatus 10 for forming such wood articles, the die apparatus 10 including a male die 12 and a female die 14 engaging a mat 16 of wood flakes therebetween. The dies 12 and 14 are adapted to be supported for movement from the spaced apart positions shown in FIG. 1 to the engaged die forming position shown in FIG. 2 by conventional press or mold clamping apparatus employing structures such as toggle means or hydraulic clamping mechanisms (not shown).

Figure 2:
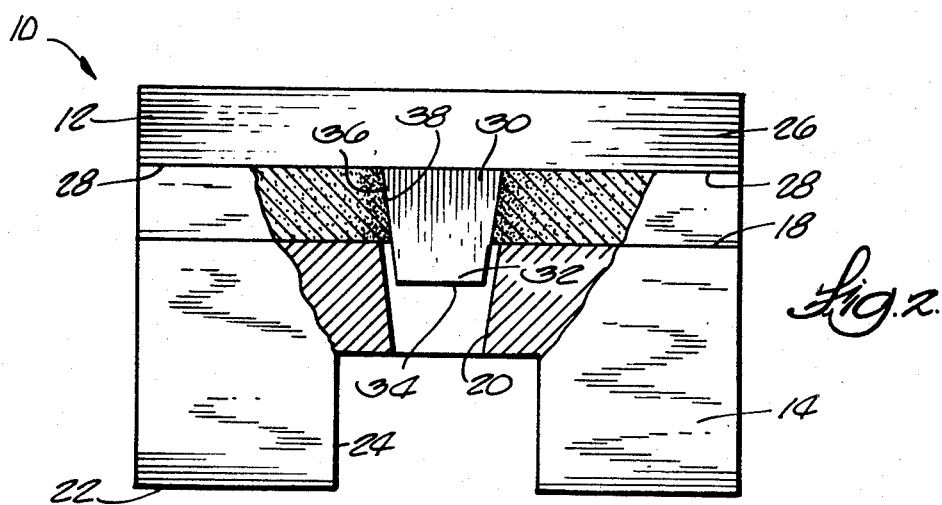
FIG. 2 is a side elevational view similar to FIG. 1 and showing the mold halves in a position where they compress the mat.

In one preferred embodiment, the die formed wood article is formed by laying a mat comprised of wood flakes and intermixed binder between the male and female dies 12 and 14 as shown in FIG. 1 and by then forcing the dies together under pressure to the position shown in FIG. 2 to thereby cause deformation and compression of the mat material and to thereby form a molded product. While various materials can be provided to form the mat 16, in one preferred construction, the mat 16 can be formed in a manner specified in co-pending U.S. patent application, Ser. No. 972,034, filed Dec. 21, 1978 pending in Group 140, titled "Pallets and Similar Articles Molded from Matted Wood Flakes," and assigned to assignees of the present application. As defined more specifically in that co-pending application, the mat 16 may be formed by intermixing a conventional binder of the type used in the manufacture of pressed wood panels with wood flakes each having an elongated thin configuration, the wood flakes being overlaid in stacked interleaved relationship to form a loosely felted, multi-layered mat having a major plane 17.

Referring more specifically to the die apparatus 10, the female die 14 includes a planar upper surface 18 intended to support the mat 16 thereon, and a central aperture 20. The female die also includes a lower surface 22 having a centrally located plug cleanout opening 24 formed therein. In the illustrated construction, the plug cleanout opening 24 forms a cavity extending approximately halfway through the female die. The plug cleanout opening communicates with the central aperture 20 and may be substantially larger in cross-section than the aperture 20. The aperture 20 extends through the female die 14 from the upper surface 18 to the plug cleanout opening 24 and converges or tapers from the upper surface 18 toward the plug cleanout opening, i.e. the apertures 20 has a larger cross-section area adjacent the upper surface 18 than that adjacent the plug cleanout opening 24.

The male die 12 includes a base plate 26 having a lower planar surface 28 for engaging the upper surface of the mat 16 and for compressing the mat. A projecting forming member 30, complementary to the aperture 20 in the female die, extends from the planar lower surface 28 and is aligned with the aperture 20 in the female die. The forming member 30 includes a free end 32 spaced from the surface 28 of the base plate 26, the free end 32 having a planar surface 34 generally parallel to the surface 28 and spaced therefrom. The forming member 30 is also constructed such that it includes tapered sides 36 which are complementary to the sides of the aperture 20 and which diverge from the free end 32 of the forming member 30 toward the surface 28.

In operation, the male die 12 and the female die 14 are separated as shown in FIG. 1, and a mat 16 of composite material, as described above, is laid between the dies and is supported on the planar upper forming surface 18. The male die 12 is then moved toward the forming surface 18 whereby the projecting end 32 of the forming member 30 engages the upper surface of the mat 16 and begins to force a portion of the mat downwardly through the aperture 20 in the die 14. As the forming member 30 is forced through the mat 16, tapered sides 36 of the forming member 30 apply an outward force on the periphery of the hole or aperture so formed in the mat to cause densification of the wood material at the periphery of the hole. Stated alternatively, the tapered side walls 36 of the forming member 30 tend to provide lateral compression of the mat material surrounding the forming member 30. Simultaneously, the planar forming surfaces 18 and 28 apply a compressive force on the mat 16 thereby compressing the mat. As the mat 16 is fully compressed, the mat material forced into the aperture 20 is sheared between the edge of the upper surface 18 surrounding aperture 20 and the forming member 30, and is forced into the plug cleanout opening 24 for convenient removal.

Figure 3:
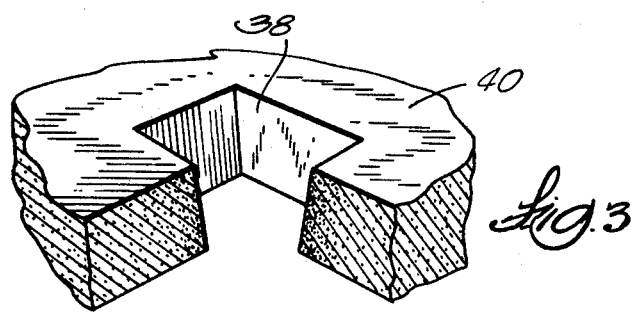
FIG. 3 is a partial perspective view of an article formed in accordance with the present invention.

The male and female dies 12 and 14 are then separated leaving a molded composite article, as shown in FIG. 3, wherein an aperture 38 is molded in the composite article 40, the aperture 38 being formed in the molded composite article simultaneously with the compression of the mat material. Accordingly, subsequent manufacturing steps are unnecessary. Another advantage of the structure formed as described above is that the aperture 38 is surrounded by densified material providing for increased strength and resistance to wear and damage.

Another advantage of the construction of the apparatus referred to above is occasioned by the use of the plug cleanout opening 24 in the female die. The plug cleanout opening permits the use of a forming member 30 having a gradual taper rather than a pointed leading end for puncturing the wood chips and a substantial taper. Since the forming member need not have a pointed end, the aperture formed in the composite article can have relatively parallel side walls.

Various features of the invention are set forth in the following claims.

I claim:

1. A method for forming a wood product comprised of wood flakes and binder intermixed therewith, the wood product including a hole therethrough, said hole having a densified periphery, the method comprising the steps of:
    (a) providing a female die plate having a forming surface and a bore through said die plate, said bore converging away from said forming surface,
    (b) providing a male die in opposed relation to said female die plate, said male die having a forming surface and a forming member extending from said forming surface and aligned with said bore, said forming member having one end adjacent said forming surface and a free end, and said forming member tapering toward said free end, (c) admixing a resinous particle board binder with thin, elongated flake-like wood particles, (d) depositing said wood particles to form a loosely felted layered mat including a major plane, substantially all of said wood particles of the mat lying in planes generally parallel to the major plane of the mat and said particles in each of said parallel planes being randomly oriented with respect to each other, (e) placing said mat of wood flakes and intermixed binder between said male die and said female die, and (f) forcing said female die plate and said male die plate together to compress said mat to form a rigid composite body and to form a hole in the rigid composite body, said hole having a tapering configuration and a periphery comprised of material more dense than the remainder of the rigid composite body.

* * * * *